United States Patent

Freeze

[15] 3,667,034
[45] May 30, 1972

[54] METHOD OF TESTING AN ELECTRICAL WINDING INCLUDING THE STEP OF CONNECTING THE WINDING TO PROVIDE A TANK CIRCUIT

[72] Inventor: John A. Freeze, South Boston, Va.

[73] Assignee: Westinghouse Electric Corporation, Pittsburgh, Pa.

[22] Filed: June 26, 1970

[21] Appl. No.: 50,152

[52] U.S. Cl. ................................................324/55, 324/51
[51] Int. Cl. .....................................G01r 31/02, G01r 31/06
[58] Field of Search ...................324/55, 51, 54, 59, 40, 57 Q

[56] References Cited

UNITED STATES PATENTS

| | | | |
|---|---|---|---|
| 2,939,073 | 5/1960 | Eul | 324/40 X |
| 3,281,672 | 10/1966 | Kuroda | 324/51 |
| 2,358,462 | 9/1944 | Mahren | 324/54 X |
| 2,825,870 | 3/1958 | Hart | 324/40 |
| 3,464,005 | 8/1969 | Wood | 324/59 X |
| 3,482,159 | 12/1969 | Clark | 324/59 X |
| 2,784,375 | 3/1957 | Mehlman | 324/57 Q |
| 2,321,424 | 6/1943 | Rohats | 324/54 |

*Primary Examiner*—Gerard R. Strecker
*Attorney*—A. T. Stratton, F. E. Browder and Donald R. Lackey

[57] ABSTRACT

A non-destructive method of testing electrical windings, including the steps of providing a tank circuit using the winding to be tested as part of the tank circuit, and tuning the tank circuit to resonance. The resonant frequency, and maximum voltage across the tank circuit at resonance, are used to determine if there are faults in the winding.

9 Claims, 3 Drawing Figures

PATENTED MAY 30 1972　　　3,667,034

WITNESSES
Edwin E. Bassler
Leon M. Garman

INVENTOR
John A. Freeze
BY Donald R. Lackey
ATTORNEY

METHOD OF TESTING AN ELECTRICAL WINDING INCLUDING THE STEP OF CONNECTING THE WINDING TO PROVIDE A TANK CIRCUIT

BACKGROUND OF THE INVENTION

1. Field of the Invention

The invention relates in general to methods of testing electrical windings, and more specifically to methods of testing the windings of electrical transformers.

2. Description of the Prior Art

Electrical power transformers are subjected to a large number of tests before shipment to a customer, such as a ratio and polarity test, resistance measurements of all windings, measurement of copper loss and impedance, measurement of the core loss and excitation current, temperature tests, insulation resistance tests, applied and induced potential tests, and surge tests. All of these tests help to insure that the transformer will be free from defects when received by the customer.

It would also be desirable to provide a non-destructive test for the windings of a transformer which may be applied at various stages of its manufacture, to detect such faults as turn-to-turn short circuits in the windings, layer-to-layer short circuits in the windings, and high reluctance joints in the magnetic core, before the transformer is completely assembled. A turn-to-turn short circuit, for example, if detected at the time of winding, may be quickly and economically repaired, compared with finding the fault after the magnetic core-winding assembly is completed and disposed in a tank filled with dielectric fluid, such as mineral oil.

SUMMARY OF THE INVENTION

Briefly, the present invention is a new and improved non-destructive method of testing electrical windings, which may be applied at any stage of their manufacture, and the method may also be used as an aid in troubleshooting windings which have failed during other tests. A capacitor is connected across the winding to be tested, providing a tank circuit, and the tank circuit is tuned to parallel resonance by a signal generator whose output frequency is sweeped across its range to locate the maximum voltage peak across the tank circuit. The resonant frequency, and voltage at resonance, are compared with test results taken from similar windings in other phases of the transformer, if it is a three-phase transformer, or with similar windings from other transformers of like construction. The test is non-destructive, as it is conducted with only a few volts applied potential, and yet is sensitive enough to detect turn-to-turn short circuits in the windings.

When testing windings after assembly with a magnetic core, information relative to the electrical condition of the windings and magnetic quality of the magnetic core may be obtained by testing the windings with and without a winding of the other phases short circuited. If both tests indicate a defect, the defect is probably a turn-to-turn short circuit in the winding. If the test conducted without a winding of the other phases short circuited indicates a fault, while the test conducted with a winding in each of the other phases short circuited fails to indicate a fault, the defect may be between layers in the winding, it may be a high reluctance joint in the magnetic core, or magnetically inferior core material.

BRIEF DESCRIPTION OF THE DRAWINGS

Further advantages and uses of the invention will become more apparent when considered in view of the following detailed description of exemplary embodiments thereof, taken with the accompanying drawings, in which.

DESCRIPTION OF PREFERRED EMBODIMENTS

Figure 1:
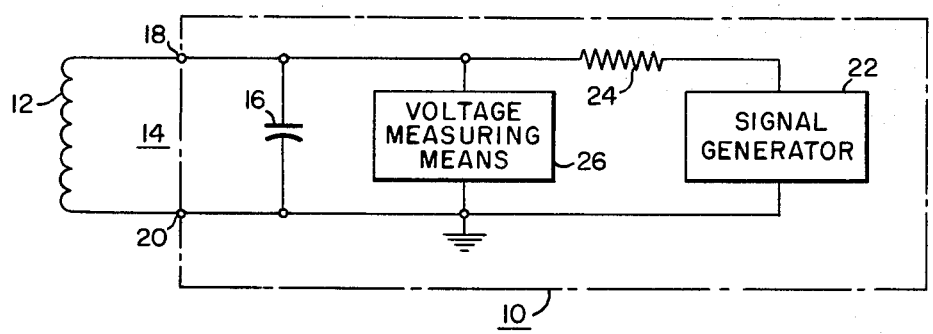
FIG. 1 is a schematic diagram of test apparatus which may be used to perform the new and improved test methods of the invention.

Referring now to the drawings, and FIG. 1 in particular, there is shown a schematic diagram of test apparatus 10, which may be used to test electrical windings according to the teachings of the invention, such as winding 12.

Broadly, the new and improved method includes the steps of providing a tank circuit, using the winding to be tested as the tank circuit inductance, and then determining the resonant frequency of the tank circuit, and the voltage across the tank circuit at resonance. The values of the resonant frequency and voltage across the tank circuit at resonance are compared with test results obtained from similarly constructed windings. A winding with a fault, such as a turn-to-turn short circuit, will have a substantially higher resonant frequency, and a substantially lower voltage across the tank circuit at resonance, than similarly constructed windings without faults, making it easy to detect a winding with a fault.

The new and improved method only requires that a few volts be applied to the tank circuit, and thus is not only a non-destructive test, but is a test which may be applied to a winding at any stage of manufacture. The test apparatus may be small and portable, and since only a few volts are involved, elaborate safety precautions and special test areas are not required to carry out the testing method. For example, the test may be applied to a winding immediately after the winding has been manufactured, to locate any turn-to-turn faults, such as due to overlapped turns in the layer which cut through the layers of paper insulation and provide metallic edge-to-edge contact between the conductive strap of which the winding is formed. While the new and improved testing methods disclosed herein may be applied to any electrical winding, for purposes of example the testing method will be applied relative to the testing of windings for electrical power transformers.

FIG. 1 illustrates the application of the new and improved testing method to a coil or winding 12 which is not yet assembled with a magnetic core, such as the low voltage or high voltage winding for one phase of a three-phase transformer, or the low voltage or high voltage winding for a single-phase transformer.

A tank circuit 14 is provided, using the winding 12 to be tested as inductance for the tank circuit, by connecting a capacitor 16 across the winding 12. Thus, test apparatus 10 may have first and second input terminals 18 and 20 which are connected to capacitor 16. Winding 12 is connected to the input terminals 18 and 20, thus forming the tank circuit 14.

The size of the capacitor 16 is selected according to the types and sizes of electrical windings to be tested, such that parallel resonance of the tank circuit may be obtained within a predetermined frequency range. Parallel resonance is defined as resonance obtained when the signal originates outside the resonant circuit. In determining the size of the capacitor 16, the range of inductances of the windings to be tested may be approximated by the formula:

$$L = \frac{N^2 T^2 (10^{-6})}{4H}$$

where:

$L$ is the coil inductance in Henries, $N$ is the number of turns in the winding, $T$ is the mean turn dimension of the winding in inches, and $H$ is the effective height of the winding in inches.

After the range of inductances is found for the different windings to be tested, a capacitor size may be selected, using a suitable nomograph chart, or formula for parallel resonance, which will provide parallel resonance in the sweep range of the signal generator used. A range of 100 hz to 100 khz has been found to be suitable. By using a signal in the audio and low ultrasonic frequency range the capacitive effects of the winding and leads may be ignored. For testing rectangular windings for medium power core-form type transformers, a capacitor having a value of 0.001 µfd. has been found to be suitable.

A signal generator 22 is connected to the tank circuit 14 via an isolating resistor 24. A value of 270 K has been found to be suitable for resistor 24. Signal generator 24 is selected to provide the adjustable frequency range required, and it may generate sine or square waves. For example, an astable multivibrator with a battery as a power supply may be used, especially if apparatus 10 is portable, or a sine wave generator connectable to a source of alternating current potential may be used.

The tank circuit 14 is tuned to parallel resonance by sweeping the output frequency of the signal generator 22 across its range, while measuring the voltage which appears across the tank circuit with voltage measuring means 26. Since voltage measuring means 26 is connected across the tank circuit, it must have a high input impedance to prevent its loading the tank circuit and affecting the accuracy of the readings. An oscilloscope, or a vacuum tube voltmeter would be suitable for this purpose.

Parallel resonance of the tank circuit 14 is obtained when the voltage is a maximum across the tank circuit 14. At parallel resonance, the current provided by the signal generator 22 will be at its minimum, the voltage drop across the isolating resistor 24 will also be at its minimum, and the voltage across the tank circuit 14 will be a maximum. Since several voltage peaks may occur throughout the frequency range of the signal generator 22, due to harmonics of the fundamental resonant frequency, care must be taken to select the largest or maximum peak, as the maximum peak occurs at the fundamental resonant frequency.

Winding 12 may represent a winding immediately after the winding's manufacturing step, it may represent the winding at any subsequent stage in the assembly of the transformer, or it may represent the winding in a completed transformer after it has been assembled with a magnetic core. The test data taken at any stage of manufacture should be compared with a similar winding at the same stage of manufacture. Windings for three-phase transformers may be compared with similar windings of the other phases, while windings for single-phase transformers should be compared with the results taken from similar windings of similarly constructed and rated transformers.

Figure 2:
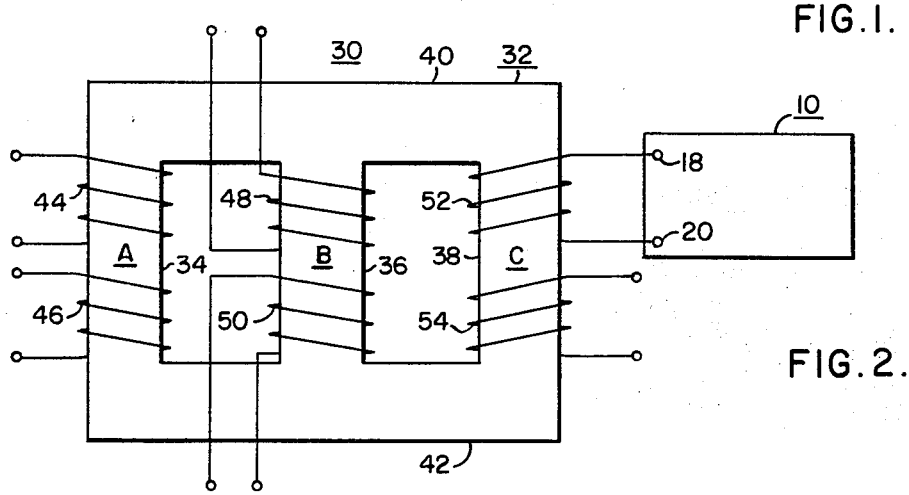
FIG. 2 is a functional elevational view of a three-phase transformer of the core-form type, illustrating a step in the method of testing windings according to the teachings of the invention.
Figure 3:
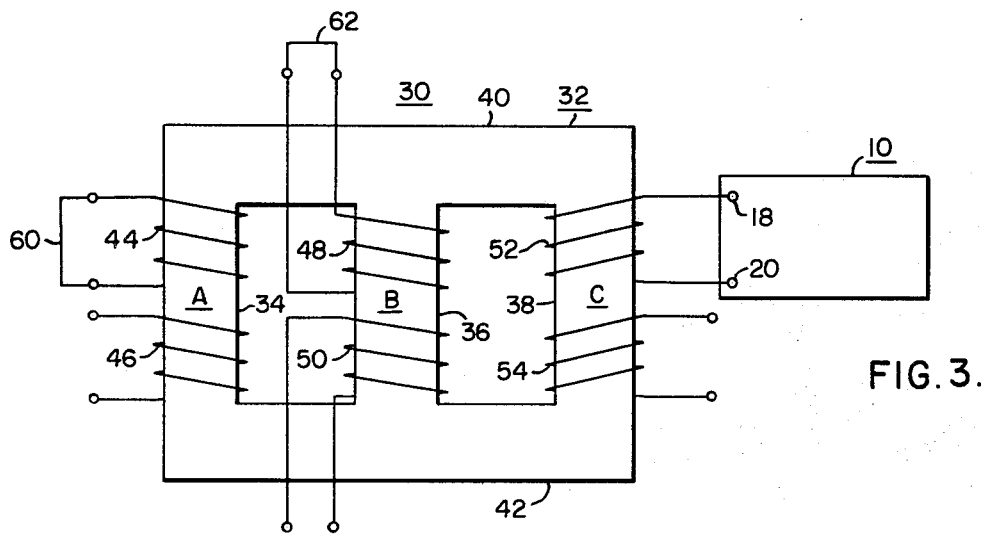
FIG. 3 illustrates the three-phase transformer shown in FIG. 2, with the windings connected according to another step of the new and improved testing method.

Extremely valuable information concerning the condition of the windings and magnetic core may be obtained immediately after the magnetic core-winding assembly is completed, and before the phase windings are interconnected into their final delta or wye configurations. FIGS. 2 and 3 illustrate two steps of the new method applied to a three-phase transformer 30, after the windings have been assembled on the magnetic core. Transformer 30 includes a three-legged magnetic core 32 of the core-form type, shown in elevation, having winding leg members 34, 36 and 38, the ends of which are joined by upper and lower yoke members 40 and 42, respectively. High and low voltage windings, shown schematically, are disposed about each of the winding legs, with the high and low voltage windings of each leg forming one phase of the three-phase transformer winding arrangement. While the high and low voltage windings of each leg are shown axially spaced, they are usually radially spaced in actual core-form practice.

More specifically, the first phase, which will be called phase A, includes high and low voltage windings 44 and 46, respectively, disposed about the first outer winding leg 34; the second phase, phase B, includes high and low voltage windings 48 and 50, respectively, disposed about the inner winding leg 36; and, the third phase, phase C, includes high and low voltage windings 52 and 54 disposed about the second outer winding leg 38.

Using test apparatus 10 constructed as described relative to FIG. 1, all of the windings are isolated from one another, and each is tuned to parallel resonance, with the resonant frequency and voltage at resonance being noted for each winding. For example, as shown in FIG. 2, high voltage winding 52 is connected to terminals 18 and 20 of test apparatus 10, and tested to obtain the resonant frequency, and voltage at resonance, for winding 52. High voltage windings 44 and 48 would be similarly tested, and the results from these tests compared, In interpreting the data, the voltage at resonance for the winding disposed on the inner leg member of the magnetic core 32 should be 30 to 40 percent higher than the voltage values obtained for the windings disposed on the outer leg members 34 and 38. This difference in readings is due to the geometry of the magnetic core. The reluctance of the magnetic paths for windings disposed on the inner leg 36 are lower than the reluctance of the magnetic paths for the windings disposed on the outer leg members 34 and 38. If the magnetic core is specially constructed to provide the same reluctance for all paths, then the voltage at resonance will be the same for windings on all three legs.

Table I lists the results obtained by testing the high voltage windings of a three-phase power transformer in which no faults were found. The data obtained from these same windings before they were assembled with a magnetic core is also listed. It will be noted that when the windings are tested when assembled on a magnetic core, the voltage at resonance for phase B is about 30 percent higher than it is for windings in the A and B phases, which is normal. When tested without the magnetic core, the voltages at resonance for all three windings are substantially the same.

TABLE I

| Windings for three-phase transformer | Phase | Capacitor, µfd. | Input voltage | Voltage across tank circuit | Resonant frequency |
| --- | --- | --- | --- | --- | --- |
| Windings on magnetic core. | A | .001 | 4 volts | 2.3 volts | 785 hz. |
|  | B | .001 | 4 volts | 3.2 volts | 740 hz. |
|  | C | .001 | 4 volts | 2.5 volts | 790 hz. |
| Same windings without magnetic core. | A | .001 | 4 volts | 0.9 volt | 4.5 khz. |
|  | B | .001 | 4 volts | 1.0 volt | 4.7 khz. |
|  | C | .001 | 4 volts | 0.9 volt | 4.4 khz. |

If the tests results obtained are drastically different for one of the windings, indicating a fault either in the winding or in the portion of the magnetic core the winding is associated with, additional data concerning the nature and/or location of the fault may be obtained by repeating the tests while shorting a winding of each phase not then being tested. This step of the method is shown in FIG. 3, which illustrates the transformer 30 of FIG. 2 with windings 44 and 48 shorted by conductors 60 and 62, respectively, while high voltage winding 52 is being tested. When winding 48 is being tested, the shorting conductor 62 will, of course, be removed, and windings 44 and 52 would have their output terminals shorted. When winding 44 is being tested, windings 48 and 52 would have their output terminals shorted. Shorting one winding of each phase not being tested simulates an air core for the windings, as it effectively removes the magnetic core from the windings. A shorted winding on a winding leg increases the reluctance of that leg, and the winding reacts as though it had an air core. If the windings now pass the test with the magnetic core effectively removed, the fault is either in the magnetic core, such as a poor joint magnetically in the phase affected, or the fault may be in the winding, but instead of a turn-to-turn fault, which would show up in the simulated air core test, it may be a layer-to-layer fault in the winding, or a strap-to-strap fault in multi-strap windings.

Table II lists the results obtained on a three-phase transformer rated 2,500 KVA, 34,400/480. It will be noted that when the windings were tested with a magnetic core, phase B voltage was not 30 to 40 percent higher than the phase A and phase C voltages, indicating a problem in phase B. The windings were tested again, with a winding in each phase not being tested short circuited, and the test results indicate no fault, which rules out a turn-to-turn short circuit. Thus, the problem is either between the layers of the winding, or in the magnetic core. Inspection found a fault between the winding layers.

TABLE II

| Windings for three-phase transformer | Phase | Capacitor, μfd. | Input voltage | Voltage across tank circuit | Resonant frequency |
|---|---|---|---|---|---|
| Windings on magnetic core. | A | .001 | 4 volts | 3 volts | 360 hz. |
|  | B | .001 | 4 volts | 3 volts | 360 hz. |
|  | C | .001 | 4 volts | 3 volts | 370 hz. |
| Simulated air core (windings of other phase shorted). | A | .001 | 4 volts | 1.25 volts | 1.75 khz. |
|  | B | .001 | 4 volts | 1.3 volts | 1.64 khz. |
|  | C | .001 | 4 volts | 1.25 volts | 1.64 khz. |

Table III lists test results taken from five different three-phase power transformers. The windings of the first transformer were tested according to the teachings of the invention, without a magnetic core. The readings are normal, indicating no turn-to-turn faults in the windings.

The windings of the second transformer were tested without a magnetic core, and the results for phase C are drastically lower than for the other two phases. A turn-to-turn short circuit was found in the winding for phase C.

The windings of the third transformer were tested when disposed on a magnetic core, and produced normal readings, indicating no faults in the windings or magnetic core.

The windings of the fourth transformer were tested with a magnetic core, and the results for phase C indicate a problem in either the phase C winding, or the portion of the magnetic core which is associated with the phase C winding.

The windings of the fifth transformer were tested with a magnetic core, but with a winding in each phase not under test short circuited, to simulate an air core. The readings are normal, indicating no turn-to-turn faults.

TABLE III

| Three-phase transformer | Phase | Capacitor, μfd. | Input voltage, volts | Voltage across tank circuit, volts | Resonant frequency | Comments |
|---|---|---|---|---|---|---|
| #1, windings tested without magnetic core | A | .001 | 4 | 0.36 | 14.5 khz | Normal readings. |
|  | B | .001 | 4 | 0.39 | 14.3 khz |  |
|  | C | .001 | 4 | 0.36 | 14.3 khz |  |
| #2, windings tested without magnetic core | A | .001 | 4 | 2.5 | 560 hz | Fault in phase C. |
|  | B | .001 | 4 | 2.5 | 560 hz |  |
|  | C | .001 | 4 | 0.5 | 2.3 khz |  |
| #3, windings tested with magnetic core | A | .001 | 4 | .76 | 2.15 khz | Normal readings. |
|  | B | .001 | 4 | 1.04 | 1.95 khz |  |
|  | C | .001 | 4 | .76 | 2.15 khz |  |
| #4, windings tested with magnetic core | A | .001 | 4 | 1.7 | 880 hz | Fault in phase C. |
|  | B | .001 | 4 | 2.2 | 880 hz |  |
|  | C | .001 | 4 | 0.05 | 3.5 khz |  |
| #5, windings tested with magnetic core [1] | A | .001 | 4 | .23 | 11.8 khz | Normal readings. |
|  | B | .001 | 4 | .22 | 12.1 khz |  |
|  | C | .001 | 4 | .22 | 10.8 khz |  |

[1] But with a winding shorted in each phase not under test, to simulate air core.

Transformers which have a static shield wrapped about and connected to a high voltage winding, may be tested to determine if there is continuity from the static shield lead, to the static shield. The continuity between the shield and the lead is tested while the winding is being resonated according to the teachings of the invention, and before the static shield lead is connected to the winding, by connecting the static shield to the opposite side of the coil that it is to be connected to in service. If there is continuity between the lead and the static shield the amplitude of the resonant frequency will collapse. If the voltage does not collapse across the tank circuit, the lead is broken from the static shield.

In summary, there has been disclosed a new and improved, non-destructive method of testing electrical windings at any stage of their manufacture, as well as troubleshooting windings to locate defects or faults found by other tests. The testing method may be performed quickly and accurately by non-skilled personnel, and since only a few volts are applied to the winding being tested, the test is non-destructive and does not require special precautions essential in high voltage tests. The new and improved testing method locates turn-to-turn faults in a winding, which faults are difficult to locate by a ratio test, especially when the fault is in the high voltage winding. The windings may conveniently be tested for faults immediately after they are manufactured, allowing any faults therein to be corrected quickly and inexpensively, compared with the time and cost involved in locating and repairing the same defect after the windings have been assembled on the magnetic core and disposed in the transformer tank.

The new and improved method also provides information concerning the magnetic condition of the magnetic core, by testing windings disposed on the core with and without a winding of the other phases short circuited. Poor or high reluctance joints, and core material of poor magnetic quality are reflected in the test results.

I claim as my invention:

1. A method of testing an electrical winding, comprising the steps of:
   connecting a capacitor across the winding to be tested, to provide a tank circuit,
   connecting an adjustable frequency power supply to the tank circuit,
   connecting voltage measuring means to obtain a measure of the voltage across the tank circuit,
   determining the resonant frequency of the tank circuit by adjusting the output frequency of the adjustable frequency power supply to provide the maximum voltage across the tank circuit,
   and comparing the resonant frequency of the tank circuit, and the maximum voltage across the tank circuit, with the values of resonant frequency and maximum voltage obtained from a similar winding.

2. The method of claim 1 wherein the winding tested is for a three-phase transformer, with the comparison step using resonant frequency and voltage values obtained from similar windings of the other phases of the three-phase transformer.

3. The method of claim 1 wherein the winding tested is for a three-phase transformer, with the windings of the transformer being already assembled with a magnetic core at the time of the test, and including the steps of short-circuiting a winding in each of the phases not under test, to effectively remove the magnetic core from the windings.

4. The method of claim 1 wherein the winding tested is for a three-phase transformer, with the windings of the transformer being already assembled with a magnetic core at the time of the test, wherein a winding of each phase of the transformer is tested to determine its resonant frequency and maximum voltage, with the results compared with those from like windings in the other phases, and including the additional steps of retesting each of the windings to determine their resonant frequency, and voltage at resonance, with a winding in each phase not under test short circuited.

5. A method of testing the electrical windings of a transformer, comprising the steps of:
   providing a tank circuit by connecting a capacitor across a winding to be tested,
   determining the resonant frequency of the tank circuit, and the voltage across the tank circuit at resonance, by:
   a. connecting a signal generator to the tank circuit, b. connecting voltage measuring means to obtain a measure of the voltage across the tank circuit, and
c. sweeping the output frequency of the signal generator across its range to obtain the maximum voltage peak across the tank circuit, and comparing the resonant frequency and maximum voltage values obtained with the test values obtained from a similar winding.

6. The method of claim 5 wherein the transformer includes a static shield wrapped about and adapted for connection to one end of a winding, and including the step of checking the continuity of the static shield lead to the static shield by connecting the static shield lead to the other end of the winding while the measure of the voltage across the tank circuit is being obtained, whereby the voltage across the tank circuit will collapse if there is continuity between the static shield lead and the static shield.

7. The method of claim 5 wherein the transformer whose windings are being tested is a three-phase transformer having a magnetic core with two outer winding legs and an inner winding leg, on which the windings are disposed, and the comparison step compares the results obtained from similar windings of the other phases, whereby the maximum voltage for a winding disposed on the inner leg is about 30 to 40 % higher than the maximum voltage of the windings on the outer two legs, for a transformer with no apparent faults.

8. The method of claim 5 wherein the windings are assembled with a magnetic core at the time of test, and including the step of shorting the ends of a winding of each phase not under test, to effectively remove the magnetic core from the windings.

9. The method of claim 5 wherein the transformer is a three-phase transformer with the windings already assembled with a magnetic core at the time of test, wherein each winding of the transformer is tested to determine its resonant frequency and voltage at resonance, with the results compared with like windings of the other phases, and including the additional steps of retesting the windings to determine their resonant frequency, and voltage at resonance, with a winding in each phase not under test short circuited, to obtain information relative to the magnetic quality of the magnetic core, as well as the electrical condition of the windings.

* * * * *